US009150776B2

(12) United States Patent
Cross

(10) Patent No.: US 9,150,776 B2
(45) Date of Patent: Oct. 6, 2015

(54) ADDITIVES FOR IMPROVING HYDROCARBON RECOVERY

(75) Inventor: Kimberly Jantunen Cross, Hoffman Estates, IL (US)

(73) Assignee: Nalco Company, Naperville, IL (US)

(*) Notice: Subject to any disclaimer, the term of this patent is extended or adjusted under 35 U.S.C. 154(b) by 698 days.

(21) Appl. No.: 13/158,919

(22) Filed: Jun. 13, 2011

(65) Prior Publication Data

US 2012/0312533 A1    Dec. 13, 2012

(51) Int. Cl.
*E21B 43/24* (2006.01)
*C09K 8/592* (2006.01)
*C09K 8/58* (2006.01)

(52) U.S. Cl.
CPC . *C09K 8/58* (2013.01); *C09K 8/592* (2013.01); *E21B 43/2406* (2013.01)

(58) Field of Classification Search
CPC ... E21B 43/24; E21B 43/166; E21B 43/2406; E21B 43/2408; C09K 8/592
USPC .................................. 166/305.1, 272.1, 303
See application file for complete search history.

(56) References Cited

U.S. PATENT DOCUMENTS

| | | | |
|---|---|---|---|
| 2,862,558 A | 12/1958 | Dixon et al. | |
| 3,954,141 A * | 5/1976 | Allen et al. | 166/403 |
| 4,068,716 A | 1/1978 | Allen | |
| 4,141,415 A | 2/1979 | Wu et al. | |
| 4,425,242 A | 1/1984 | Penny et al. | |
| 4,884,635 A | 12/1989 | McKay et al. | |
| 6,305,472 B2 | 10/2001 | Richardson et al. | |
| 7,691,788 B2 | 4/2010 | Tan et al. | |
| 2005/0194292 A1 | 9/2005 | Beetge et al. | |
| 2006/0076273 A1 | 4/2006 | Cobb | |
| 2009/0078415 A1 | 3/2009 | Fan et al. | |
| 2009/0159288 A1 | 6/2009 | Horvath Szabo et al. | |
| 2010/0130386 A1 | 5/2010 | Chakrabarty | |

OTHER PUBLICATIONS

European Search Report for Appln. No. 12799762.5 dated Jul. 6, 2015.

* cited by examiner

*Primary Examiner* — Catherine Loikith

(74) *Attorney, Agent, or Firm* — Brinks Gilson & Lione; Eric D. Babych

(57) ABSTRACT

A hydrocarbon from a subterranean formation can be recovered by contacting the hydrocarbon with water or steam and one or more additives. The hydrocarbon can be selected from heavy or light crude oil, bitumen, an oil sand ore, a tar sand ore, and combinations thereof. The additive can be, for example, an aromatic hydrocarbon. The water or steam and the additive can be injected into the subterranean formation. Compositions or mixtures include hydrocarbons, water or steam, and additives.

15 Claims, 2 Drawing Sheets

ADDITIVES FOR IMPROVING HYDROCARBON RECOVERY

BACKGROUND OF THE INVENTION

1. Field of the Invention

The disclosure pertains to hydrocarbon production or recovery. In particular, the disclosure pertains to hydrocarbon production or recovery methods incorporating steam, water, and/or additives.

2. Description of the Related Art

At or beneath its surface, the earth contains deposits of crude oil and bituminous sands, known as tar sands or oil sands. If these deposits are located sufficiently close to the earth's surface, they can be recovered using surface or strip mining techniques. The mined ore typically contains about 10-15% bitumen, 80-85% mineral matter with the balance being water, and requires separation of the valued bitumen product from the mineral matter. This bitumen liberation process begins by initially mixing or slurrying the ore with warm water in a hydrotransport line. The resultant slurry is then fed to a primary separation vessel or cell. In this separation process, additional warm water is added and the majority of the liberated bitumen will become attached to air bubbles where it is recovered by flotation. The bitumen liberation and recovery process generally occurs at a pH of about 8.5, which is generally obtained with the assistance of caustic soda. The coarse mineral matter is removed from the bottom of the vessel and a middlings portion, containing water, fine mineral matter, and suspended bitumen is sent for further bitumen recovery.

If the crude oil or bituminous sands are located sufficiently below the surface of the earth, oil wells can be drilled to assist in the extraction of these materials. However, heavy hydrocarbons can prove difficult to recover or produce due to their high viscosities. Various extraction, recovery, or production methods are known in the art such as flooding the formation with steam in an attempt to reduce the viscosity of the hydrocarbons to enable flow and aid in production.

One such method known as Cyclic Steam Simulation or the "huff-and-puff" method involves stages of injecting high pressure steam, soaking the formation, and production. The initial stage involves steam injection for a period of weeks to months to heat the hydrocarbon, bitumen or heavy oil resource in the reservoir, thereby reducing its viscosity such that it will be able to flow. Following injection, the steam is allowed to soak in the formation for a period of days to weeks to allow heat to further penetrate the formation. The heavy oil, sufficiently reduced in viscosity, is then produced from the same well until production begins to decline upon which time the three step cycle is repeated.

Another recovery or production method used in the art is referred to as steam assisted gravity drainage (SAGD). The SAGD recovery method relies on two parallel, horizontal wells approximately 1 km in length. An upper "injector well" resides above a lower "producing well." The producing well is situated as close as possible to the bottom of the reservoir. Initially, steam is injected into both wells to begin heating the formation. After a period of time, the formation is sufficiently heated such that the viscosity of the hydrocarbons or bitumen is reduced and the hydrocarbons or bitumen are now able to enter the production well. Once this occurs, steam injection into the production well is ceased.

Low pressure steam is continuously injected into the injector well, resulting in the formation of a steam chamber, which extends laterally and above as the process continues. At the edge of the steam chamber, the steam releases its latent heat into the formation. This process heats the hydrocarbons and/or bitumen causing it to be sufficiently reduced in viscosity to drain along the edge of the steam chamber under the influence of gravity to the lower producing well. It can then be pumped to the surface along with the resultant steam condensate. At that point, the formed water and bitumen emulsion is separated.

In addition to imparting a viscosity reduction on the hydrocarbons and/or bitumen, the steam condenses and a hydrocarbon-in-water emulsion forms allowing the hydrocarbon to travel more readily to the producing well. SAGD processes typically recover about 55% of the original hydrocarbon or bitumen-in-place over the lifetime of the well.

Although this process has advantages, there are drawbacks as well. For example, with respect to bitumen production, the SAGD process relies on the energy intensive production of steam to assist with bitumen recovery. It requires natural gas, significant amounts of fresh water, and water recycling plants. Further, as the method relies upon gravity drainage, production rates can be limited due to the high viscosity of the bitumen. Although the prior art has contemplated different variations to the SAGD process, such as the addition of certain additives, the additives have not been successful and their presence has resulted in, for example, emulsions of additive, water, and bitumen that cannot be broken because the additives have caused the emulsion to be stable.

Therefore, seeking out additives that could increase the amount of bitumen produced for the same steam input is highly desirable. Additives could possess properties such as directly improving the heat efficiency within a formation as well as reducing the oil-water interfacial tension. Moreover, successful additives will lower the steam to oil ratio meaning less steam will be necessary to produce the same amount of bitumen due to the presence of the additive. Also, desirable additives will not interfere with the resulting emulsion such that it cannot be broken. Finally, a successful additive should be volatile enough to be carried with the steam through the sand pack to reach the bitumen pay.

BRIEF SUMMARY OF THE INVENTION

A process for recovering a hydrocarbon from a subterranean formation is disclosed. The subterranean formation can include any number of wells, such as two wells. The disclosed process includes the steps of contacting a hydrocarbon from a subterranean formation with steam or water, contacting the hydrocarbon with one or more aromatic hydrocarbons, and recovering the hydrocarbon. The hydrocarbon can be contacted by the steam or water and/or the one or more aromatic hydrocarbons at any time during recovery of the hydrocarbon. The hydrocarbon is selected from the group consisting of light or heavy crude oil, bitumen, an oil sand ore, a tar sand ore, and combinations thereof. The hydrocarbon can be contacted with the steam or water and aromatic hydrocarbon inside of the subterranean formation or outside of the subterranean formation. The steam and the aromatic hydrocarbons can be injected into the subterranean formation independently or as a mixture. The process can be a steam assisted gravity drainage process that incorporates the addition of the one or more aromatic hydrocarbons.

A process for the recovery of bitumen from a subterranean formation is also disclosed. The subterranean formation can include any number of wells, such as two wells. The process includes the steps of contacting the bitumen with steam or water, contacting the bitumen with one or more aromatic hydrocarbons, and recovering the bitumen. The bitumen can be contacted by the steam or water and/or the one or more aromatic hydrocarbons at any time during recovery of the bitumen. The bitumen can be contacted with the steam or water and aromatic hydrocarbon inside of the subterranean formation or outside of the subterranean formation. The steam and the aromatic hydrocarbons can be injected into the subterranean formation independently or as a mixture. The process can be a steam assisted gravity drainage process that incorporates the one or more aromatic hydrocarbons.

A composition or mixture of components is also disclosed. The composition or mixture includes a hydrocarbon, water or steam, and one or more aromatic hydrocarbons. The hydrocarbon can be selected from the group consisting of light or heavy crude oil, bitumen, an oil sand ore, a tar sand ore, and combinations thereof.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

A detailed description of the invention is hereafter described with specific reference being made to the drawings in which.

DETAILED DESCRIPTION OF THE INVENTION

Figure 1:
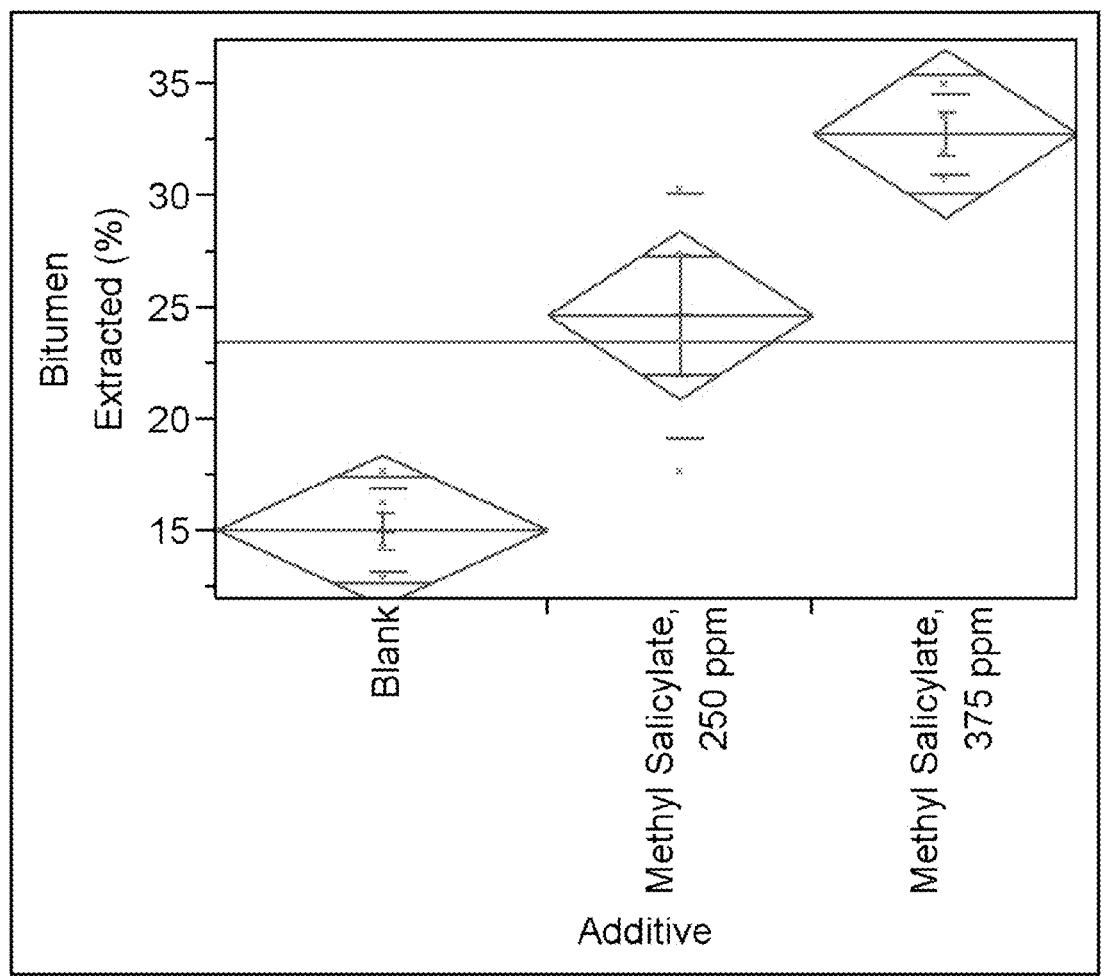
FIG. 1 is comparative data for the blank, 250 ppm and 375 ppm of methyl salicylate.

This disclosure relates to methods of producing or recovering hydrocarbons, such as light or heavy crude oil, bitumen, and oil or tar sand ores. Compositions and mixtures including the produced or recovered hydrocarbons are also disclosed herein.

It has been found that addition of additives, such as aromatic hydrocarbons, greatly enhances hydrocarbon extraction. In the present application, hydrocarbon is understood to mean viscous or heavy crude oil, light crude oil, tar sands or oil sands oil, or bitumen.

A process for recovering a hydrocarbon is disclosed involving two parallel, horizontal wells approximately 1 km in length. The process can be an SAGD process or any other suitable process. An upper injector well resides above a lower producing well in the SAGD process. The wells can be separated by any suitable distance, for example, approximately 4-6 meters. Initially, steam is injected downhole into one or both of the wells where it condenses and begins heating the formation and the hydrocarbon(s) therein. Generally, steam is injected into the well head and this process is readily understood by those skilled in the art. The steam can be injected at high pressures and can be at a temperature of about 500° C. After a period of time, the formation is sufficiently heated such that the viscosity of the hydrocarbon is reduced.

Over time, low pressure steam can be continuously injected into the injector well, resulting in the formation of a steam chamber, further heating the hydrocarbon causing it to be sufficiently reduced in viscosity to drain along the edge of the steam chamber to the lower producing well by way of gravity where it can be pumped to the surface along with the condensed steam and/or the additive. At that point, the water and/or additive are separated from the hydrocarbon in water emulsion and the hydrocarbon can be recovered using various known methods in the art such as "breaking" the emulsion.

An additive according to the present disclosure, such as an aromatic hydrocarbon, can also be injected into either one of the wells, or both of the wells. The additive can be injected independently of the steam or it can be added as a mixture with the steam. The steam may be injected continuously or intermittently into one or both of the wells. Moreover, the additive may be injected continuously or intermittently into one or both of the wells. Also, if the steam and additive are added as a mixture, the mixture can be added either continuously or intermittently into one or both of the wells.

Additive addition may occur at, but is not limited to, the steam header, at the well head, or it can be added into the boiler feed water.

The additive can be injected into one or both of the wells at any point during production such as when production begins or when production begins to diminish. For example, when hydrocarbon production begins to decline in the well, the additive described herein can be added. By adding the additive after production has begun to decline, the recovery level can be brought back to or near an optimal or peak hydrocarbon recovery level.

A process for the recovery of bitumen from a subterranean formation is also disclosed. The process can be a steam assisted gravity drainage process and the bitumen can be recovered from a hydrocarbon bearing ore, such as oil sands or tar sands. The process may involve two parallel, horizontal wells approximately 1 km in length, which are drilled in an oil sand or tar sand formation. An upper injector well resides above a lower producing well. The wells can be separated by any suitable distance, for example, approximately 4-6 meters. Initially, steam is injected downhole into one or both of the wells where it condenses and begins heating the formation and the bitumen therein. Generally, steam is injected into the well head and this process is readily understood by those skilled in the art. The steam condenses and heats the formation and the bitumen residing therein. The steam can be injected at high pressures and can be at a temperature of about 500° C. After a period of time, the formation is sufficiently heated such that the viscosity of the bitumen is reduced.

Over time, low pressure steam can be continuously injected into the injector well, resulting in the formation of a steam chamber, further heating the bitumen causing it to be sufficiently reduced in viscosity to drain along the edge of the steam chamber to the lower producing well by way of gravity where it can be pumped to the surface along with the condensed steam and/or an additive. At that point, the water and/or additive are separated from the bitumen in water emulsion and the bitumen can be recovered using various known methods in the art such as "breaking" the emulsion.

An additive according to the present disclosure, such as an aromatic hydrocarbon, can also be injected into either one of the wells, or both of the wells, to contact the bitumen. The additive can be injected independently of the steam or it can be added as a mixture with the steam. The steam may be injected continuously or intermittently into one or both of the wells. Moreover, the additive may be injected continuously or intermittently into one or both of the wells. Also, if the steam and additive are added as a mixture, the mixture can be added either continuously or intermittently into one or both of the wells.

Additive addition may occur at, but is not limited to, the steam header, at the well head, or it can be added into the boiler feed water.

The additive can be injected into one or both of the wells at any point during recovery such as when production begins or when production begins to diminish. For example, when bitumen production begins to decline in the well, the additive described herein can be added. By adding the additive after production has begun to decline, the recovery level can be brought back to or near an optimal or peak bitumen recovery level.

It is noted that when carrying out the recovery or production methods disclosed herein, any number of wells, even a single well, can be used. No matter the number of wells selected, the steam and additive described herein can be injected into any of the wells, or all of the wells. The additive can be injected independently of the steam or it can be added as a mixture with the steam into any of the wells. The steam may be injected continuously or intermittently into any of the wells. Moreover, the additive may be injected continuously or intermittently into any of the wells. Also, if the steam and additive are added as a mixture, the mixture can be added either continuously or intermittently into any of the wells.

Also, hydrocarbons can be mined or extracted from a formation and the hydrocarbon can be separated outside of the formation using any known method in the art such as, for example, a primary separation vessel. Such a separation process can be carried out with the assistance of heated water, the additive disclosed herein, and optionally other additives, such as caustic soda. In certain variations, the hydrocarbons are fed into hydrotransport lines and contacted therein by the heated water and optionally the additives, which conditions the ore and starts the bitumen liberation process. The resultant slurry can then be fed into one or more primary separation vessels. A hydrocarbon primary froth is separated at the top of the vessel while the sand settles at the bottom. The hydrocarbon froth is then subjected to further processing.

The contents other than those in the hydrocarbon primary froth can go through secondary separation processes where further hydrocarbon can be recovered.

The additive disclosed herein can be added either separately, or as a mixture with the heated water, at any time during primary, secondary, and/or tertiary separation or recovery, to enhance the hydrocarbon recovery and/or minimize the amount of water used.

Further, bitumen can be mined or extracted from a formation and the bitumen can be separated from, for example, oil or tar sand, outside of the formation using any known method in the art such as, for example, a primary separation vessel. Such a separation process can be carried out with the assistance of heated water, the additive disclosed herein, and optionally other additives, such as caustic soda. In certain variations, the oil or tar sand bitumen is fed into hydrotransport lines and contacted therein by the heated water and optionally the additives, which conditions the ore and starts the bitumen liberation process. The resultant slurry can then be fed into one or more primary separation vessels. A bitumen primary froth is separated at the top of the vessel while the sand settles at the bottom. The bitumen froth is then subjected to further processing.

The contents other than those in the bitumen primary froth can go through secondary separation processes where further bitumen can be recovered.

The additive disclosed herein can be added either separately, or as a mixture with the heated water, at any time during separation or secondary separation, to enhance the bitumen recovery and/or minimize the amount of water or used.

Compositions are also disclosed herein. The compositions can include one or more hydrocarbons, water or steam, and one or more additives. The additives can be the additives described in the present application, such as the aromatic hydrocarbon additives. Such a composition can be obtained from a subterranean formation by contacting one or more hydrocarbons in a subterranean formation with heated water or steam, contacting the one or more hydrocarbons in the subterranean formation with an additive, such as an aromatic hydrocarbon described herein, and recovering the resulting emulsion from the formation. Such a composition can also be obtained by contacting the hydrocarbon with water or steam, as well as an additive, such as an aromatic hydrocarbon described herein, outside of the subterranean formation.

Also disclosed is a composition including water or steam, an additive, such as the aromatic hydrocarbons described herein, and bitumen. Such a composition can be obtained from a subterranean formation by contacting bitumen in a subterranean formation with heated water or steam, contacting the bitumen in the subterranean formation with an additive, such as an aromatic hydrocarbon described herein, and recovering the resulting emulsion from the formation. The water or steam and additive can be added independently of each other or can be added as a mixture. Such a composition can also be obtained by contacting the bitumen with water or steam, as well as an additive, such as an aromatic hydrocarbon described herein, outside of the subterranean formation.

Various additives are contemplated by the present disclosure. The additive disclosed herein can be, for example, one or more aromatic hydrocarbons. The additive possesses some degree of aromaticity. Typically, unless surface or strip mining techniques are being used, the aromatic hydrocarbon has an atmospheric boiling point of less than or equal to about 300° C. The aromatic hydrocarbon should have volatility sufficient to allow for delivery to the production front unless surface or strip mining techniques are being used. The aromatic hydrocarbon can possess at least one functional group. For example, the aromatic hydrocarbon additive can possess any functional group selected from the group consisting of, but not limited to, an alcohol, ether, aldehyde, ketone, carboxylic acid, or ester functional group, or any combination thereof. Examples of aromatic hydrocarbon additives useful in connection with the present disclosure include, but are not limited to, methyl salicylate, methylsalicylic acid (3,4,5, or 6-methyl substituted), salicylic acid, phenyl acetate, benzoic acid, methyl 4-hydroxybenzoate, benzyl acetate, benzaldehyde, or acetophenone, and any combination or mixture thereof. Typically, the one or more aromatic hydrocarbons are added at a concentration from about 25 to about 50,000 ppm by weight of the aromatic hydrocarbon in the steam (wt/wt aromatic hydrocarbon additive to steam basis). The preferred dosage of the aromatic hydrocarbons is from about 1,000 ppm to about 5,000 ppm, with the most preferred being about 100 to about 1,000 ppm.

The foregoing additives increase the amount of bitumen produced for the same steam input. Without wishing to be bound by any theory, it is considered that these additives could possess properties such as directly improving the heat efficiency within a formation as well as reducing the oil-water interfacial tension. Moreover, the disclosed additives will lower the steam to oil ratio meaning less steam will be necessary to produce the same amount of hydrocarbon or bitumen due to the presence of the additive. Further, these additives will not interfere with the resulting emulsion such that it cannot be broken. When the emulsion product is recovered from the formation, it must be broken to obtain the desired hydrocarbons. It has been found that certain amine additives can interfere with this process such that the produced emulsion cannot be broken and therefore, the desired hydrocarbon(s) cannot readily be obtained. The additives of the present disclosure overcome this problem. Finally, these additives are volatile enough to be carried with the steam through the sand pack to reach the bitumen pay.

Processes wherein the additive of the present disclosure can be beneficial to the hydrocarbon recovery include, but are not limited to, cyclic steam stimulation, steam assisted gravity drainage, vapor recovery extraction methods, mining or extraction techniques, and the like.

The foregoing may be better understood by reference to the following examples, which are intended only for illustrative purposes and are not intended to limit the scope of the invention.

Example 1

A sample of oilsands ore (15 g) was charged into a pre-weighed stainless steel holder containing several holes. The oilsands ore contained 13.51% bitumen, 83.45% solids, and 3.04% water. A cellulose thimble to account for any solids extracted as a consequence of the method, approximately 4 cm in length, was placed beneath the stainless holder and the two were placed into a jacket Soxhlet extractor. Deionized water (300 mL) and methyl salicylate was charged into a 500 mL round bottom flask beneath the extractor unit. Blank runs were additionally conducted in the same manner excluding methyl salicylate. The extractor and round bottom flask were wrapped with insulation and aluminum foil, and the extraction ran at high temperature for 4 hours. The extraction was then allowed to cool, the stainless holder removed, wiped of any extracted bitumen, and allowed to dry in a 105° C. oven for 2 days. The cellulose thimble containing any solids extracted as a consequence of the extraction process was placed in the oven to dry overnight.

Following drying in the oven, the stainless holder and cellulose thimble were allowed to cool to room temperature and weighed. The amount of bitumen extracted was determined based on the amount of bitumen initially present in the ore, accounting for solids losses in the extraction process and water losses in the oven. To determine the amount of bitumen extracted, it was assumed that 66% of the connate water in the original ore sample would be lost over a 2 day period in the oven (Equation 1).

$$\text{Bitumen Extracted (\%)} = \frac{\text{Ore assuming 66\% of connate H}_2\text{O lost (g)} - (\text{Final ore (g)} + \text{Dried solids extracted (g)})}{\text{Initial bitumen in ore (g)}} \times 100\%$$

Equation 1.

Bitumen extracted (%) using Test Method A.

Dosages of 250 or 375 ppm of methyl salicylate (based on the water) were tested (FIG. 1 and Table 1). The mean bitumen extracted for the blank (n=5) was 15.06% (SD=1.87%), the 250 ppm dose of methyl salicylate (n=4) was 24.67% (SD=5.48%) and the 375 ppm dose was 32.78% (SD=1.85%). All of the methyl salicylate additions resulted in p-values of less than 0.05 when compared to the blank, and were considered to be statistically significant (Table 2).

TABLE 1

Mean, standard deviation, and number of runs for the blank and methyl salicylate runs.

| Level | Number of Repeat Runs | Mean Bitumen Extracted (%) | Std Dev |
|---|---|---|---|
| Blank | 5 | 15.06 | 1.87 |
| Methyl Salicylate, 250 ppm | 4 | 24.67 | 5.48 |
| Methyl Salicylate, 375 ppm | 4 | 32.78 | 1.85 |

TABLE 2

Comparative data with p-values for additives tested. A p-value less than 0.05 indicated a statistically significant difference.

| Level | −Level | p-Value |
|---|---|---|
| Methyl Salicylate, 375 ppm | Blank | <.0001* |
| Methyl Salicylate, 250 ppm | Blank | 0.0017* |

Example 2

Figure 2:
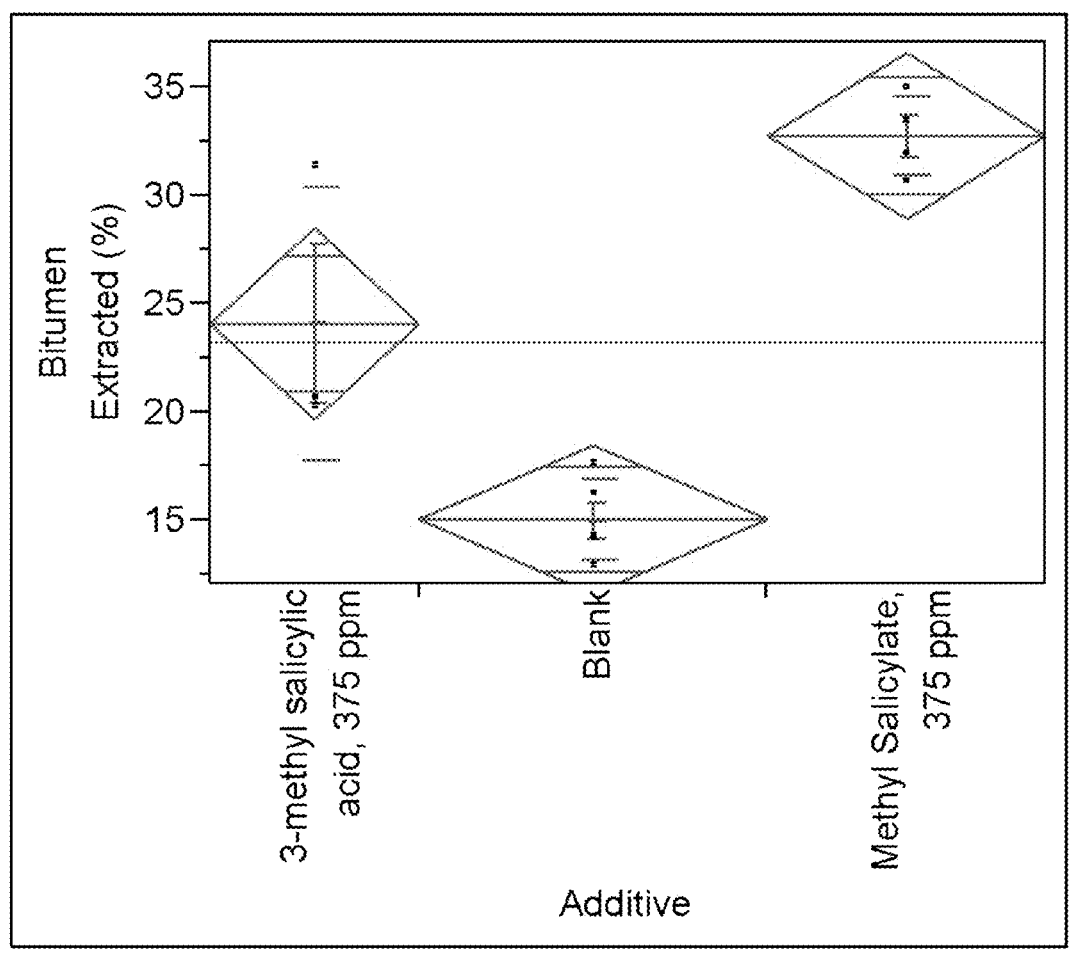
FIG. 2 is comparative data for the blank, 3-methyl salicylic acid, and methyl salicylate.

Using the above test method, 3-methyl salicylic acid was tested at a dosage of 375 ppm (based on the water). Addition of this compound to the extraction experiment resulted in a mean bitumen extracted (n=3) of 24.11% (SD=6.28%), which was a statistically significant improvement over the blank. Results are shown in FIG. 2 and Table 3. Table 4 shows that the data resulted in p-values of less than 0.05 when compared to the blank, and were considered to be statistically significant.

TABLE 3

Additives tested with number of repeat runs, the mean and standard deviation for the runs.

| Level | Number of Repeat Runs | Mean Bitumen Extracted (%) | Std Dev |
|---|---|---|---|
| Blank | 5 | 15.06 | 1.87 |
| 3-methylsalicylic acid, 375 ppm | 3 | 24.11 | 6.28 |
| Methyl Salicylate, 375 ppm | 4 | 32.78 | 1.85 |

TABLE 4

Comparative data with p-values for additives tested. A p-value less than 0.05 indicated a statistically significant difference.

| Level | −Level | p-Value |
|---|---|---|
| Methyl Salicylate, 375 ppm | Blank | <.0001* |
| 3-methylsalicylic acid, 375 ppm | Blank | 0.0052* |

Example 3

Oilsands ore (15 g) was charged into a stainless holder containing several holes on the bottom and an open top. For these experiments, extraction glassware that enabled direct contact of steam and volatilized additive with the ore was used. Deionized water or boiler feed water (BFW), as specified, (200 mL) and additive were added to the round bottom portion of extraction glassware. Directly above the round bottom portion of the extraction flask sat a coarse stainless steel grid to support the holder containing the oilsands ore sample. The extraction flask was wrapped with insulation and aluminum foil and the experiment was refluxed for 4 h. The collected bitumen in water was separated using a rotary evaporator (rotovap) and subsequently extracted with toluene into a 100 mL volumetric flask. Bitumen stuck to the sides of the flask was extracted with toluene and added to the bitumen obtained following rotovap separation. The bitumen on the sides of the stainless holder was accounted for by collecting with a pre-weighed cleaning tissue. The pH of the water following rotovap separation was measured.

Following the bitumen extraction with steam and volatized additive, the remaining bitumen in the ore was determined by Dean-Stark extraction with toluene. A blank was also run in the same manner without additive using either deionized water or BFW, as specified. The bitumen extracted with steam was compared to the total bitumen extracted and expressed as bitumen recovery (Equation 2).

$$\text{Bitumen Recovery (\%)} = \frac{\text{Bitumen extracted with steam (g)}}{\text{Bitumen extracted with steam (g)} + \text{Bitumen extracted with toluene (g)}} \times 100\% \quad \text{Equation 2.}$$

Bitumen Recovery Using Test Method B.

Using this test method, salicylic acid and phenyl acetate were tested in addition to methyl salicylate. All of these additives outperformed the blank (Table 5). Two additional experiments were carried out using BFW instead of deionized water. The blank for this run had a bitumen recovery of 11.24% whereas the methyl salicylate (dosed at 565 ppm based on the concentration in the water) had a bitumen recovery of 17.36%.

TABLE 5 pH and Bitumen Recovery data for additives investigated.

| Additive | Dose (ppm) | pH of H$_2$O after extraction | Bitumen Recovery (%) |
|---|---|---|---|
| Blank | — | 8.92 | 7.33% |
| Methyl salicylate | 375 | 8.49 | 14.61% |
| Methyl salicylate | 565 | 8.22 | 16.65% |
| Methyl salicylate | 565 | 9.05 | 13.21% |
| Salicylic acid | 570 | 4.05 | 13.16% |
| Phenyl Acetate | 750 | 5.76 | 10.55% |
| Blank-BFE | — | 8.18 | 11.24% |
| Methyl salicylate-BFE | 565 | 8.61 | 17.36% |

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A process for recovering a hydrocarbon from a subterranean formation comprising the steps of: (i) contacting a hydrocarbon from a subterranean formation with steam or water; (ii) contacting the hydrocarbon from the subterranean formation with one or more aromatic hydrocarbons, wherein the hydrocarbon from the subterranean formation is contacted with the steam or water and the one or more aromatic hydrocarbons inside of the subterranean formation, wherein the one or more aromatic hydrocarbons have atmospheric boiling points of less than or equal to about 300° C. and/or the one or more aromatic hydrocarbons comprise a functional group selected from: an alcohol, ether, aldehyde, ketone, carboxylic acid, ester, and combinations thereof, and wherein the one or more aromatic hydrocarbons are added at a concentration from about 250 to about 50,000 ppm by weight of the aromatic hydrocarbon in the steam; and (iii) recovering the hydrocarbon from the subterranean formation.

2. The process of claim 1, wherein the hydrocarbon from the subterranean formation is selected from: heavy or light crude oil, bitumen, an oil sand ore, a tar sand ore, and combinations thereof.

3. The process of claim 1, wherein contacting the hydrocarbon from the subterranean formation with the water or steam and/or the one or more aromatic hydrocarbons occurs at any time during recovery of the hydrocarbon from the subterranean formation.

4. The process of claim 1, wherein the one or more aromatic hydrocarbons are selected from: methyl salicylate, methylsalicylic acid (3,4,5, or 6-methyl substituted), salicylic acid, phenyl acetate, benzoic acid, methyl 4-hydroxybenzoate, benzyl acetate, benzaldehyde, and acetophenone, and any combination or mixture thereof.

5. The process of claim 1, wherein the one or more aromatic hydrocarbons are added at a concentration from about 1000 to about 50,000 ppm by weight of the aromatic hydrocarbon in the steam.

6. The process of claim 1, wherein contacting the hydrocarbon with the steam and the aromatic hydrocarbons comprises injecting the steam and the aromatic hydrocarbons into the subterranean formation independently or injecting the steam and the aromatic hydrocarbons into the subterranean formation as a mixture.

7. The process of claim 1, wherein the subterranean formation comprises any number of wells.

8. The process of claim 1, wherein the subterranean formation comprises two wells.

9. A process for the recovery of bitumen from a subterranean formation comprising the steps of: (i) contacting the bitumen with steam or water; (ii) contacting the bitumen with one or more aromatic hydrocarbons, wherein the bitumen is contacted with the steam or water and the one or more aromatic hydrocarbons inside of the subterranean formation, wherein the one or more aromatic hydrocarbons have atmospheric boiling points of less than or equal to about 300° C. and/or the one or more aromatic hydrocarbons comprise a functional group selected from: an alcohol, ether, aldehyde, ketone, and ester, and combinations thereof; and (iii) recovering the bitumen.

10. The process of claim 9, wherein contacting the bitumen with the steam or water and/or the one or more aromatic hydrocarbons occurs at any time during recovery of the bitumen.

11. The process of claim 9, wherein the one or more aromatic hydrocarbons are selected from: methyl salicylate, phenyl acetate, methyl 4-hydroxybenzoate, benzyl acetate, benzaldehyde, and acetophenone, and any combination or mixture thereof.

12. The process of claim 9, wherein the one or more aromatic hydrocarbons are added at a concentration from about 25 to about 50,000 ppm by weight of the aromatic hydrocarbon in the steam.

13. The process of claim 9, wherein contacting the bitumen with the steam and the aromatic hydrocarbons comprises injecting the steam and the aromatic hydrocarbons into the subterranean formation independently or injecting the steam and the aromatic hydrocarbons into the subterranean formation as a mixture.

14. The process of claim 9, wherein the subterranean formation comprises any number of wells.

15. The process of claim 9, wherein the subterranean formation comprises two wells.

\* \* \* \* \*